Oct. 3, 1950  W. L. DAWBARN  2,524,562
LIFT-CALIBRATING NOZZLE FOR METEOROLOGICAL BALLOONS
Filed Jan. 25, 1947

Inventor
Waring L. Dawbarn
By Theodore C. Browne
Attorney

Patented Oct. 3, 1950

2,524,562

UNITED STATES PATENT OFFICE 2,524,562

LIFT-CALIBRATING NOZZLE FOR METEOROLOGICAL BALLOONS

Waring L. Dawbarn, Winchester, Mass., assignor to Dewey and Almy Chemical Company, North Cambridge, Mass., a corporation of Massachusetts Application January 25, 1947, Serial No. 724,344

1 Claim. (Cl. 226—20.6)

This invention concerns a lift-calibrating nozzle for the inflation of meteorological balloons.

In the use of meteorological balloons for studying weather conditions it is essential to inflate the balloon with an exact weight of lifting gas in order that the exact free lift, the ascension velocity, and the bursting altitude of the balloon may be determined. When rapidly changing air conditions must be investigated, many observations follow in rapid sequence. Weighing the cylinders or the balloon is far too slow.

This invention provides an inflating nozzle which automatically indicates when the correct weight of gas has inflated the balloon. It also avoids errors in gas loading, which occur when strings or ties are used to hold the balloon on a nozzle during inflation, by incorporating a clamping device of known weight. Consequently, it greatly increases the speed and accuracy with which meteorological balloons can be inflated.

The invention comprises, in combination, a nozzle made of a light weight metal, e. g., aluminum, and a clamping ring adapted to fit closely into an annular depression in the nozzle.

Figure 1:
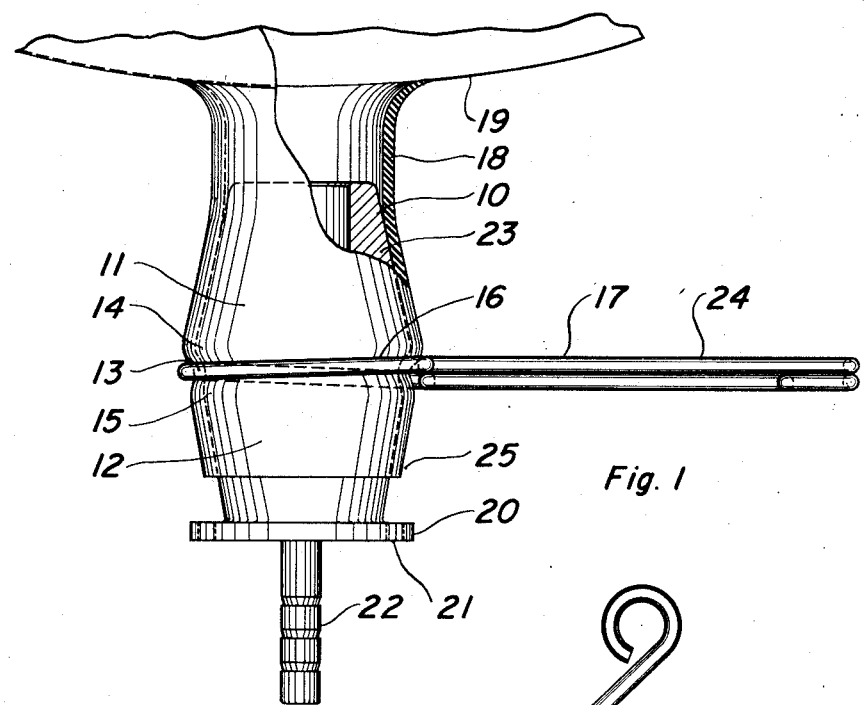
Figure 1 is an elevation partly in section showing the neck of a meteorological balloon fitted over the nozzle in inflating position and held in place by the clamp.
Figure 2:
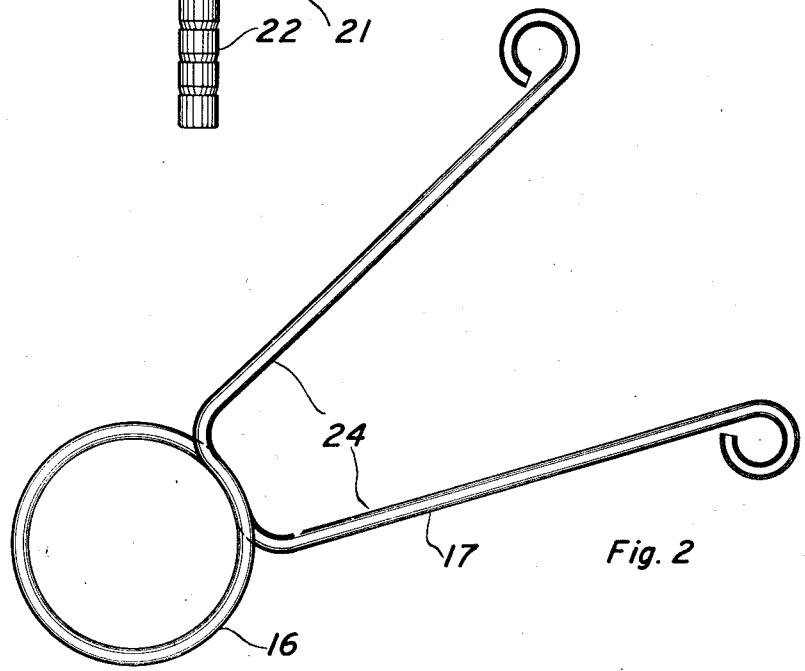
Figure 2 is a view of the clamp alone.

With reference to the drawings, the nozzle 10 is fashioned in the shape of two truncated cones 11 and 12, having their larger bases in contact. An annular depression 13 is formed around the nozzle at the junction of the two cones. The base of the upper cone 11 has a somewhat larger diameter 14 than the diameter 15 of the lower cone 12. The ring 16 of the clamp 17 fits tightly into the channel 13 between the conical sections and holds the neck 18 of the balloon 19 to the nozzle. The nozzle is provided with a lower flange 20 on which the clamp 17 rests when not in use over a balloon, and in which holes 21 are drilled for the attachment of additional weights to the apparatus. The tube 22 is fitted in operation into the hose from the gas supply. In manufacture, the metal in the thick wall 23 of the nozzle 10 is removed until the weight of the nozzle and the clamp together is equal to the exact gross lift desired for the balloon.

If a greater rate of ascension is desired, or if heavier equipment is to be carried by the balloon, additional known weights may be suspended from the holes 21 drilled in the flange 20 of the nozzle 10. In this way the weight of the inflating apparatus is kept equal to any desired gross lift of the balloon.

In operation, hydrogen or helium gas is supplied through the tube 22 and the nozzle 10 to the balloon 19 until the lifting force of the gas is just enough to raise the nozzle and clamp from the supporting surface. At this point the gas supply is shut off, the neck of the balloon is closed by suitable means such as tying, the clamp is slipped down, and the balloon pulled off the nozzle and released.

The opposed conical shape of the nozzle gives the following advantages:

(a) It may be easily inserted in the neck of the balloon and the neck slipped down to its final position.

(b) As the neck slides over the greatest diameter 14 of the nozzle 10 it is stretched to such an extent that the elastic inward radial force will be greater than any distending gas pressure within the balloon, thus preventing the gas from freeing the balloon from the nozzle and allowing it to be blown off.

(c) The increased diameter 14 of the base of the conical portion 11 prevents the ring 16 from being accidentally removed from the nozzle.

(d) The reduced diameter of the base of the conical portion 12 allows the ring 16 when expanded by gripping the tongs 24 to slide down the conical section 12 and free the balloon. There is no chance therefore that the clamp and nozzle could be accidentally disassembled and the wrong clamp used with the nozzle to change the calibration of the device.

When the neck of the balloon is stretched over the nozzle, it will not be distended by the inflating gas pressure. The increasing lifting force of the balloon, however, tends to slide the lower edge 25 of the neck upward and over the largest diameter 14 of the nozzle, at which point the balloon would be blown off. The clamp, locking the neck into the channel 13 just below the maximum diameter of the nozzle, produces a snubbing effect which prevents such creepage and thus completely secures the balloon during inflation.

I claim:

A balloon inflating nozzle having a calibrated total weight capable of indicating automatically when a balloon has the desired free-lift, provided with a through bore adapted to conduct gas into a balloon envelope, said nozzle being fashioned in the shape of two axially aligned opposed frustro-conical sections arranged base to base, the base diameter of the upper conical portion being larger than the base diameter of the lower conical portion, a locking channel formed circumferentially around the nozzle adjacent the line where the bases of the two conical portions join, a cooperating expandible ring clamp normally positioned in the locking channel and adapted to secure the neck of a balloon to the nozzle, the ring of said clamp when in open position being of lesser diameter than the base diameter of the upper conical portion but of greater diameter than the base diameter of the lower conical portion of said nozzle, and a flange adjacent the minor base of said lower conical portion of greater diameter than the open position diameter of said expandible ring.

WARING L. DAWBARN.

REFERENCES CITED

The following references are of record in the file of this patent:

UNITED STATES PATENTS

| Number | Name | Date |
|---|---|---|
| 89,879 | Meyerberg | May 11, 1869 |
| 220,576 | Chillis | Oct. 14, 1879 |
| 1,067,202 | Stacey | July 8, 1913 |
| 1,853,473 | Terwilliger et al. | Apr. 12, 1932 |
| 2,343,276 | Carlson | Mar. 7, 1944 |